Dec. 17, 1957  G. E. SENS  2,816,389
FISHING ROD
Filed Feb. 25, 1955
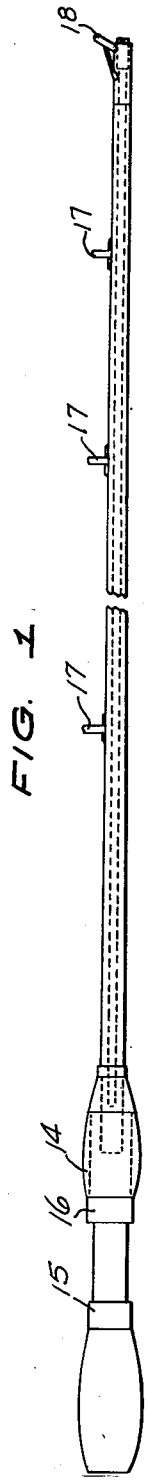
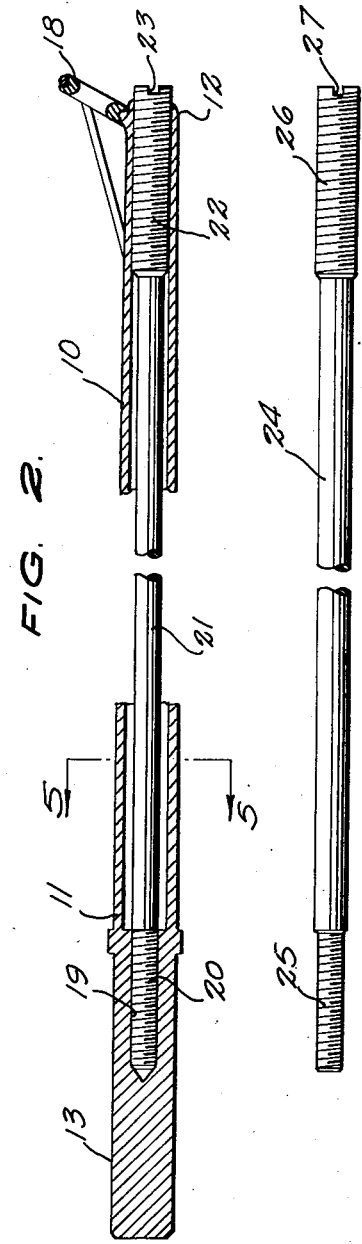
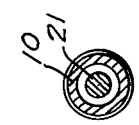
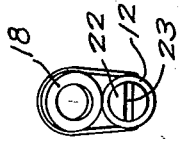
INVENTOR.
GUY E. SENS,
BY
McMorrow, Berman, + Davidson
ATTORNEYS.

United States Patent Office 2,816,389
Patented Dec. 17, 1957

2,816,389

FISHING ROD

Guy E. Sens, Herndon, Va.

Application February 25, 1955, Serial No. 490,479

2 Claims. (Cl. 43—18)

The present invention relates to a fishing rod.

The primary object of the present invention is to provide a fishing rod having means for varying its flexibility so as to permit the use of a single rod for different kinds of fishing.

Another object of the present invention is to provide a fishing rod having adjustable flexibility and being simple in structure, one sturdy in construction, economical to manufacture and assemble, and one highly effective in action.

These and other objects and advantages of the present invention will be fully apparent from the following description when taken in connection with the annexed drawings, in which:

Figure 1 is a side view in elevation of the assembled fishing rod of the present invention;

Figure 2 is a side view in cross section of the rod portion of the present invention, showing one form of the inner core member installed therein;

Figure 3 is a side view in elevation of a second form of a core member;

Figure 4 is an end view of the fishing rod of the present invention; and

Figure 5 is an end view in cross section on line 5—5 of Figure 2.

Referring in greater detail to the drawings, in which like numerals indicate like parts throughout the several views, the present invention comprises a fishing rod having a semiflexible tubular member 10 provided with a closed end 11 at one end and an open end 12 at the other end, the closed end having an extension forming a ferrule by means of which it is inserted in a bore in one end of a handle 14, as shown in Figure 1.

The handle 14 is provided with a reduced portion having sleeves 15 and 16 which receive the legs of a reel (not shown) and the rod portion of the fiishing rod is provided with eye formations 17 along its length and an end eye formation 18 by means of which the fishing line is strung from one end of the rod to the other. The one end portion of the tubular member 10 adjacent the ferrule 13 is provided with a threaded bore 19 in which is threadedly engaged the threaded one end 20 of a semirigid core member 21 which is seen in Figure 2 to have an enlarged other end portion 22 provided with cooperating threads received in the threaded end portion adjacent to the open end 12 of the tubular member 10. The end of the core member 21 which is disposed adjacent the open end 12 of the tubular member 10 is provided with a laterally positioned slot 23 which will receive the end of a screw driver for threading the core member 21 within the tubular member 10 whenever it is desired to connect or disconnect the core member 21 from the tubular member 10.

In Figure 3 a differently dimensioned core member 24 is shown having a larger diameter portion intermediate of its ends, the one end 25 being provided with threads to engage the threaded inner wall of the one end of the tubular member 10 and the other end 26 of the core member being provided with other cooperating threads engageable with the threaded inner wall of the other end portion adjacent to the open end 12 of the core member 10. The second core member 24 is provided with a similar slot 27 to receive the screw driver end for connecting and disconnecting this core member within the tubular member 10 whenever it is desired to have the thicker core member replace the thinner core member 21.

It is the purpose of the present invention that several core members be provided of varying thicknesses and various degrees of flexibility so that a suitable one may be positioned within the tubular member 10 to provide the degree of flexibility of the fishing rod for the particular type of fishing to be done.

A tubular member 10 and the core members that are to be used within the tubular member 10 may be constructed of various materials such as steel, plastic, glass, and other materials presently in use in the manufacture of fishing rods.

What is claimed is:

1. A fishing rod comprising a semiflexible tubular member having a closed end and an open end, a solid ferrule extending exteriorly from the closed end of said member, handle means surrounding and secured to the ferrule of said tubular member, and a solid semirigid core member insertable in said open end and spaced from said tubular member and having its inserted end detachably and threadedly secured to the ferrule of said tubular member and having the other end bridging the open end of said tubular member and threadedly secured thereto.

2. A fishing rod comprising a semiflexible tubular member having a closed end and an open end, a solid ferrule extending exteriorly from the closed end of said member, handle means surrounding and secured to the ferrule of said tubular member, and a solid semirigid core member insertable in said open end and spaced from said tubular member having its one end portion adjacent said ferrule provided with external threads detachably engaged with an internally threaded bore provided in said ferrule, said core member having its other end portion adjacent said open end of said tubular member provided with an enlarged portion having external threads detachably engaged with cooperating threads provided on the inner wall of said tubular member adjacent said open end.

References Cited in the file of this patent

UNITED STATES PATENTS

| 270,460 | Mitchell | Jan. 9, 1883 |
| 849,481 | Lobit | Apr. 9, 1907 |
| 1,285,679 | Glowacki | Nov. 28, 1918 |
| 2,478,131 | Rossi | Aug. 2, 1949 |

FOREIGN PATENTS

| 1,064,979 | France | May 19, 1954 |